(12) United States Patent
Su

(10) Patent No.: US 10,619,113 B2
(45) Date of Patent: Apr. 14, 2020

(54) METHOD AND SYSTEM FOR COAL PURIFICATION AND COMPLETE BURNING FOR CLEAN FOSSIL FUEL

(71) Applicant: Sam Su, Temple City, CA (US)

(72) Inventor: Sam Su, Temple City, CA (US)

( * ) Notice: Subject to any disclaimer, the term of this patent is extended or adjusted under 35 U.S.C. 154(b) by 155 days.

(21) Appl. No.: 15/902,962

(22) Filed: Feb. 22, 2018

(65) Prior Publication Data

US 2018/0334625 A1 Nov. 22, 2018

Related U.S. Application Data

(60) Provisional application No. 62/508,912, filed on May 19, 2017.

(51) Int. Cl.

| | |
|---|---|
| *B01D 53/00* | (2006.01) |
| *C10J 3/72* | (2006.01) |
| *C10J 3/48* | (2006.01) |
| *C10B 53/00* | (2006.01) |
| *B01D 3/14* | (2006.01) |
| *C10B 53/04* | (2006.01) |
| *C10B 47/18* | (2006.01) |
| *C10J 3/62* | (2006.01) |

(52) U.S. Cl.
CPC .............. *C10J 3/721* (2013.01); *B01D 3/14* (2013.01); *C10B 47/18* (2013.01); *C10B 53/00* (2013.01); *C10B 53/04* (2013.01); *C10J 3/482* (2013.01); *C10J 3/62* (2013.01); *B01D 2257/302* (2013.01); *B01D 2257/55* (2013.01); *C10J 2300/093* (2013.01); *C10J 2300/0959* (2013.01); *C10J 2300/12* (2013.01); *C10J 2300/1606* (2013.01); *C10J 2300/1696* (2013.01)

(58) Field of Classification Search
None
See application file for complete search history.

(56) References Cited

U.S. PATENT DOCUMENTS

| | | | | |
|---|---|---|---|---|
| 4,095,959 A | * | 6/1978 | Kunstle | ........................ C10J 3/20 48/73 |
| 4,155,990 A | * | 5/1979 | Kimura | ................ C01B 17/0404 423/567.1 |
| 4,233,275 A | * | 11/1980 | Kimura | ..................... C10K 1/04 423/230 |
| 4,769,045 A | * | 9/1988 | Grindley | .................... C10J 3/14 252/373 |

(Continued)

*Primary Examiner* — Amber R Orlando
*Assistant Examiner* — Phillip Y Shao
(74) *Attorney, Agent, or Firm* — Che-Yang Chen; Law Office of Scott Warmuth

(57) ABSTRACT

In one aspect, a method for coal purification and gasification may include steps of heating the coal including various hydrocarbons and harmful substances such as sulfides, phosphates, etc. to 900 to 1200° C. in a coal gasifier; providing a reaction chamber with oxygen and connecting with the coal gasifier; the sulfides, phosphates, etc. in the gasified coal entering the reaction chamber from the coal gasifier and reacting with the oxygen therein; separating mixtures from the reaction chamber to collect hydrocarbons in its fluidized phase; heating the fluidized hydrocarbons; and providing oxygen to react with the gasified form of hydrocarbons to achieve a complete burning of the hydrocarbons.

7 Claims, 4 Drawing Sheets

(56) References Cited

U.S. PATENT DOCUMENTS

| | | | | |
|---|---|---|---|---|
| 4,778,485 A | * | 10/1988 | Suggitt | C01B 3/36 |
| | | | | 252/373 |
| 4,832,704 A | * | 5/1989 | Grindley | C10J 3/54 |
| | | | | 48/197 R |
| 9,284,503 B2 | * | 3/2016 | de Graffenried, Sr. | C10J 3/08 |

* cited by examiner

METHOD AND SYSTEM FOR COAL PURIFICATION AND COMPLETE BURNING FOR CLEAN FOSSIL FUEL

CROSS-REFERENCE TO RELATED APPLICATIONS

This application claims priority under 35 U.S.C. § 119 (e) to U.S. Provisional Patent Application Ser. No. 62/508,912, filed on May 19, 2017, the entire contents of which are hereby incorporated by reference.

FIELD OF THE INVENTION

The present invention relates to a coal gasification process, and more particularly to a coal gasification process in which the coal can be completely gasified and completely burning to reduce pollution.

BACKGROUND OF THE INVENTION

One of the main sources of atmospheric pollutants today is from coal-fired electrical utility boilers. In these installations, a clean fossil fuel, such as natural gas, is not a practical substitute for coal in the generation of electricity because of scarcity and cost. Furthermore, the available supply of clean fuel may combat pollution more effectively when used to fulfill residential and small commercial needs.

During conventional coal burning or gasification process, when the temperature is above the coal's softening point, plastic properties of coal start to develop. Upon reaching this point, generally between about 370° C. and about 480° C., the coal particles begin to swell and deform due to the formation of bubbles during devolatilization. As the temperature increases, deformation becomes more severe, the coal becomes plastic and sticky, and may eventually become thin films surrounding the incompletely burning small particles. At this stage, the coal is considered incompletely gasified. The coal may then break into small tiny fine solid carbon particles and emit into the air like "black smog." The particles are solid, toxic and seriously carcinogenic, so when a great amount of the black solid carbon particles are emitted into the air, not only the environment is polluted, but the human health is seriously harmed. Therefore, there remains a need for a new and improved coal gasified process to avoid producing the harmful substances likewise "black solid smog" in the exhausted gas and make the coal completely gasify and to burn completely, and released less carbon dioxide to overcome the problems stated above.

SUMMARY OF THE INVENTION

Coal in the conventional burning, the solid form and air may not mix well before burning. In other word, the purpose of complete burning may not be achieved. To achieve complete burning, the coal in the solid form has to become gasified form, charged with electrostatic positive of the coal which can be mixed well with oxygen charged with electrostatic negative before burning to achieve complete burning purposes.

In one aspect, an improved coal gasification and purification system may include a coal gasifier, a reaction zone and a separation zone. In one embodiment, the coal is being heated without air to 900 to 1200° C. in the coal gasifier to become flammable gas and tars can be separated and fall down through the coal tar outlet pipe to the train and move away. In another embodiment, the coal can be continuously fed into the coal gasifier from the coal inlet pipe and the flammable gas, after pass through the gas filter being transported toward the reaction zone by a plurality of motors while being gasified.

The gasified coal then enters the reaction zone, the harmful substances such as sulfur (S) will be oxidized with oxygen to becoming sulfur trioxide ($SO_3$) therein, as shown in formula (i) below. And sulfur trioxide ($SO_3$) can further react with benzene ($C_6H_6$) in the reaction chamber as shown in formula (ii) below, which is called a sulfonation process to generate benzenesulfonic acid ($C_6H_5SO_3H$). It is noted that benzenesulfonic acid ($C_6H_5SO_3H$) can also be separated in the separation zone, and after add the water to becoming benzene and hydrosulfate acid ($H_2SO_4$). The hydrosulfate acid can be eliminated, and the benzene will be added back with the other coal hydrocarbons, as shown in formula below.

Sulfonation:

$$2S+3O_2=2SO_3 \quad (i)$$

$$C_6H_6+SO_3=C_6H_5SO_3H \quad (ii)$$

$$C_6H_5SO_3H+H_2O=C_6H_6+H_2SO_4 \quad (iii)$$

Same as sulfide, could be another harmful substances: phosphorous (P), after enters the reaction zone to react with oxygen after oxidation becoming phosphor trioxide ($PO_3$) etc. Also "benzene" will react with phosphor trioxide becoming phenyl phosphoric acid ($C_6H_5PO_3H$). After being separated, and isolated and add water becoming hydrophosphoric acid ($H_2PO_4$) and benzene. The hydro-phosphoric acid ($H_2PO_4$) can be eliminated, and benzene will be added back with the other coal hydrocarbons, as shown in formula below.

Phosphoriation:

$$2P+3O_2=2PO_3 \quad (iv)$$

$$C_6H_6+PO_3=C_6H_5PO_3H \quad (v)$$

$$C_6H_5PO_3H+H_2O=C_6H_6+H_2PO_4 \quad (vi)$$

Since each substance has different boiling point, the mixture can be separated by fractional distillation through which various hydrocarbons, eliminated the harmful hydrosulfate acid, and hydro-phosphoric acid, in the separation zone (described above). It is noted that the purified coal gas may include various types of hydrocarbons, such as benzene, toluene, olefin, xylene, paraffin hydrocarbon, styrene, naphthalene, etc. with difference boiling points. The more importantly, during the fractional distillation process, the coal is fluidized and cleaned, and saved as clean fossil fuel can be used in the future.

For a coal burning process, the fluidized hydrocarbons can be reheated to gasified hydrocarbons and positively charged in a first reaction chamber. Meanwhile, the oxygen in the air is negatively charged enters the second reaction chamber connecting with the first reaction chamber. The positively charged hydrocarbons and the negatively charged oxygen can both travel to a third reaction chamber where the hydrocarbons can be burned in the stove after mixed well with the oxygen to achieve the goal of the "complete" coal burning to reduce pollution since the harmful substances were removed in the coal fluidized process discussed above.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

Figure 1:
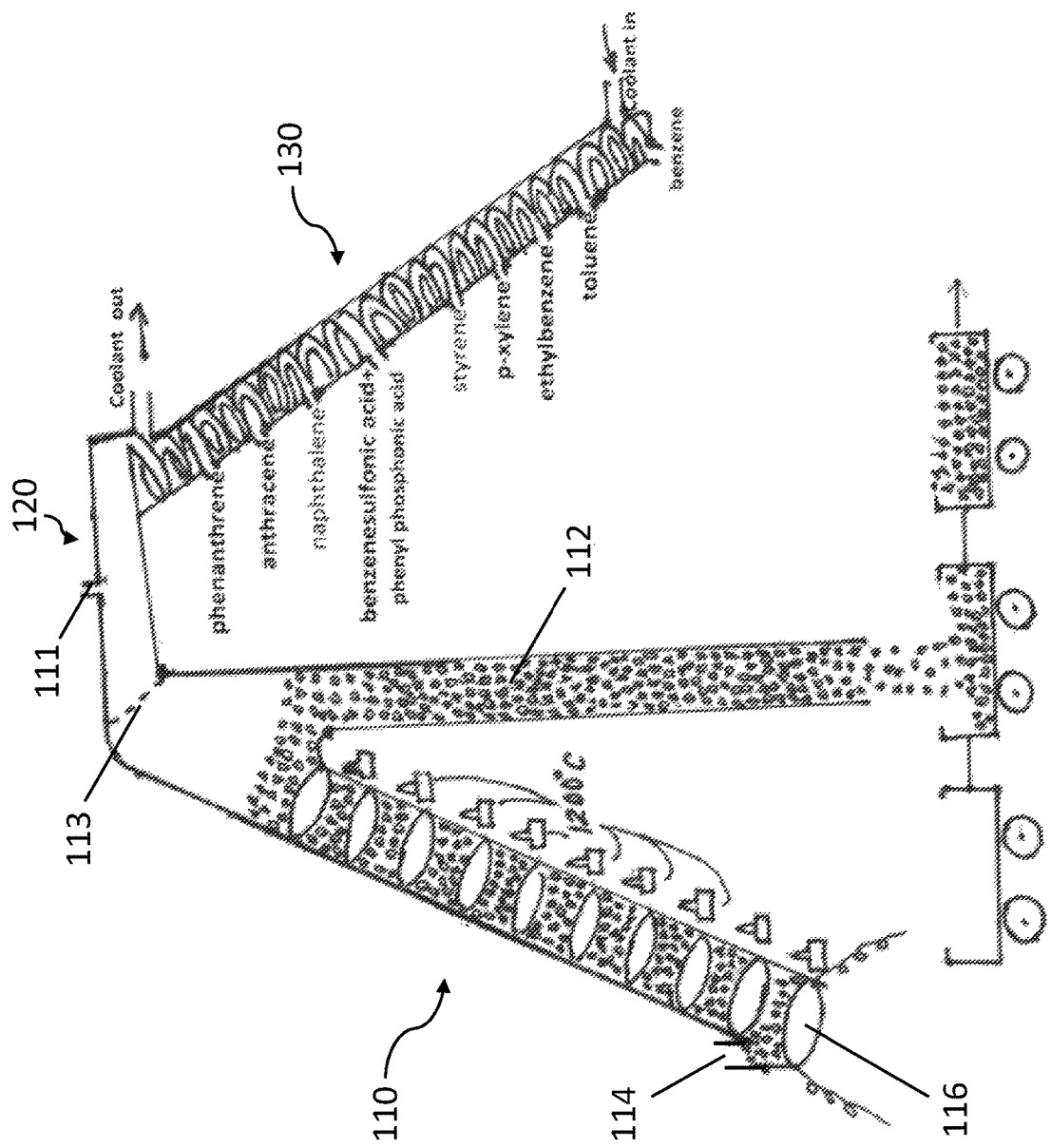
FIG. 1 is a schematic view of the coal purification and gasification system to eliminate harmful substances in the present invention.

In one aspect, as shown in FIG. 1, an improved coal gasification and purification system 100 may include a coal gasifier (110), a reaction zone (120) and a separation zone (130). In one embodiment, the coal is being heated without air to 900 to 1200° C. in the coal gasifier (110) to release the flammable gas and tars can be separated and collected from an opening coal tar outlet pipe (112) of the coal gasifier (110). In another embodiment, the coal can be continuously fed into the coal gasifier (110) from the coal inlet (114). The flammable gas after passes the gas filter (113) has being transported toward the reaction zone (120) by a plurality of motors (116) while being gasified. A tiny one way air inlet (111) in the reaction zone (120) is provided to allow small amount of air to enter and react with certain harmful substances such as sulfur (S) to becoming sulfa trioxide ($SO_3$), and phosphorous (P) to becoming phosphor trioxide ($PO_3$) etc. And benzene, one of the flammable gas in coal hydrocarbons will react with sulfa trioxide to become benzenesulfonic acid ($C_6H_5SO_3H$). Also benzene will react with phosphor trioxide to become phenyl phosphoric acid ($C_6H_5PO_3H$).

The gasified coal then enters the reaction zone (120). The certain harmful substances such as sulfides, can be oxidized to $SO_3$ as shown in formula (i) below. And $SO_3$ can further react with benzene (C6H6) in the coal as shown in formula (ii) below, which is called a sulfonation process to generate benzenesulfonic acid ($C_6H_5SO_3H$), which can be fluidized and separated in the fluidized zone (130). After separated and isolated to add water to generate benzene (C6H6) and sulfuric acid (to be eliminated) as shown in formula (iii). It is noted, same as sulfides that phosphates can also be eliminated in fluidized zone (130), through a phosphoriation process as shown in formulas (iv) to (vi) below.

More specifically, the reaction zone (120) allows the harmful substances such as sulfides and/or phosphates etc. to react with air and benzene (one of the coal flammable gases), This reacting zone (120) provides a reaction space for sulfa and phosphate etc. with oxygen and benzene to remove harmful substances, and the gasified hydrocarbons can be fluidized, separated and collected in the separation zone (130).

The gasified coal then enters the fluidizing and separation zone (130) including benzenesulfonic acid, and phenyl phosphoric acid, which will be fluidized and separated because they have different boiling points. These harmful substances such as benzenesulfonic acid ($C_6H_5SO_3H$), and phenyl phosphoric acid ($C_6H_5PO_3H$) will be separated. The isolated benzenesulfonic acid becomes benzene ($C_6H_6$) and sulfuric acid ($H_2SO_4$) after water is added. The phenyl phosphoric acid after isolated becomes benzene ($C_6H_6$) and phosphoric acid ($H_2PO_4$) after water is added. The sulfuric acid and phosphoric acid can be eliminated, and benzene can be added back to coal hydrocarbons. It is noted that the purified coal may include various types of hydrocarbons, such as benzene, toluene, olefin, xylene, paraffin hydrocarbon, styrene, naphthalene, etc. with difference boiling points.

Sulfonation:

$$2S+3O_2=2SO_3 \qquad (i)$$

$$C_6H_6+SO_3=C_6H_5SO_3H \qquad (ii)$$

$$C_6H_5SO_3H+H_2O=C_6H_6+H_2SO_4 \qquad (iii)$$

Phosphoriation:

$$2P+3O_2=2PO_3 \qquad (iv)$$

$$C_6H_6+PO_3=C_6H_5PO_3H \qquad (v)$$

$$C_6H_5PO_3H+H_2O=C_6H_6+H_2PO_4 \qquad (vi)$$

The mixture that may include benzenesulfonic acid, phenyl phosphonic acid, and the purified and gasified coal is then entering the separation zone (130). It is noted that the purified coal may include various types of hydrocarbons, such as benzene, toluene, olefin, xylene, paraffin hydrocarbon, styrene, naphthalene, etc. with difference boiling points. In one embodiment, since each substance has different boiling point, the mixture can be separated by fractional distillation. As shown in FIG. 1, various hydrocarbons, benzenesulfonic acid and phenyl phosphonic acid can be separated, and more importantly, during the fractional distillation process, the coal is fluidized and purified.

The main purpose of the present invention is to eliminate harmful substances such as sulfides and phosphates and etc. in the coal during the coal gasifying process, and further achieve the goal of a "complete" burning of the coal to significantly reduce pollution because after leaving the separation zone (130), the coal (or the hydrocarbons) is not only fluidized, but also purified.

Figure 2:
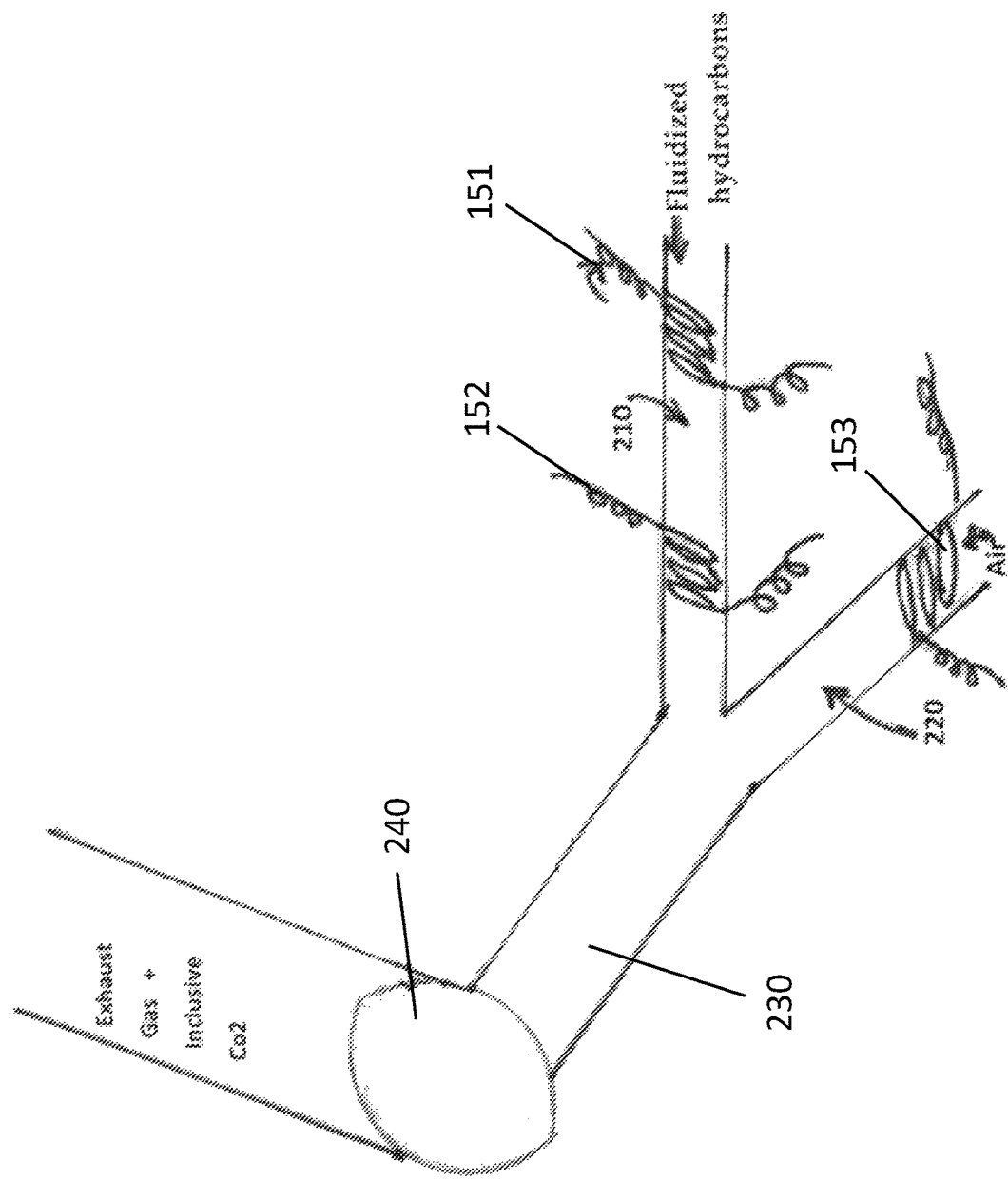
FIG. 2 is a schematic view of the reaction of reheating the purified fluidic hydrocarbons, which is gasified to mix with oxygen to achieve complete burning in the present invention.

Referring to FIG. 2 for a coal burning process, the fluidized hydrocarbons can be reheated to gasify hydrocarbons and positively electrostatically charged in a first reaction chamber (210). Meanwhile, the air enters the second reaction chamber (220) connecting with the first reaction chamber (210), and the oxygen in the air is negatively electrostatically charged. The positively charged hydrocarbons and the negatively charged oxygen can both travel to a third reaction chamber (230) to mix well with each other, and the hydrocarbon mixture can be burned with the oxygen in a fire place (240) to achieve the goal of the "complete" coal burning to reduce pollution since the harmful substances were removed in the coal fluidized process discussed above.

Figure 3:
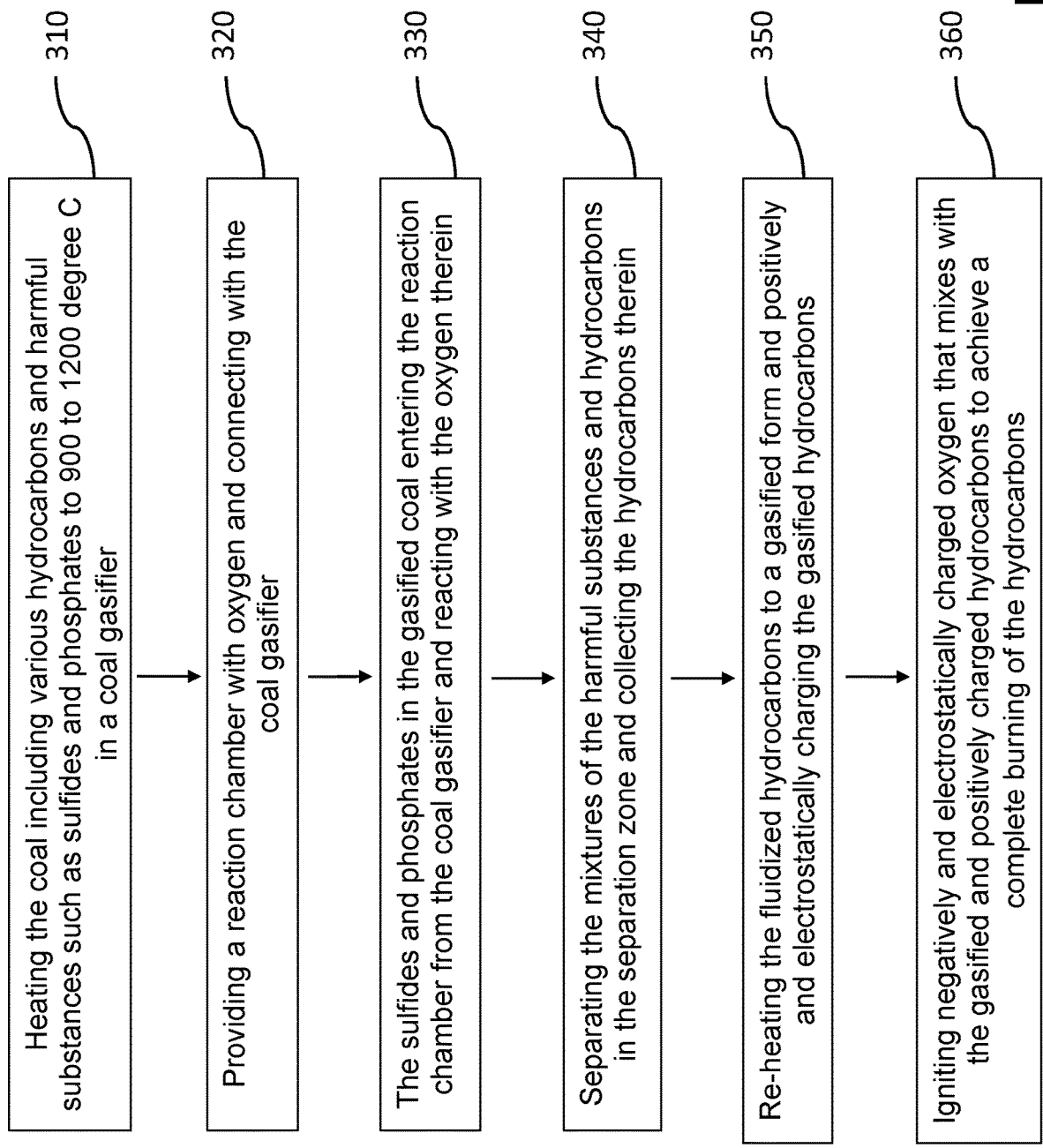
FIG. 3 illustrates a method for coal purification and gasification in the present invention.

In another aspect, as shown in FIG. 3, a method for coal purification and gasification may include steps of heating the coal including various hydrocarbons and harmful substances such as sulfides and phosphates to 900 to 1200° C. in a coal gasifier in step 310; providing a reaction chamber with oxygen and connecting with the coal gasifier in step 320; The sulfides and phosphates in the gasified coal entering the reaction chamber from the coal gasifier and reacting with the oxygen therein in step 330; The reaction chamber to fluidized distributer (130), the mixtures of the harmful substances and hydrocarbons can be separated in the fluidized distributer. Collect hydrocarbons in its fluidized phase in step 340; Re-heating the fluidized hydrocarbons to becoming gasified form of hydrocarbons and positively electrostatically charging it in step 350; And providing the negatively electrostatically charging oxygen to mix well with each other (in step 350), then ignite it in step 360 to achieve a complete burning of the hydrocarbons.

In one embodiment, the sulfides in step 330 can be oxidized to $SO_3$ as shown in formula (i) above, and $SO_3$ can further react with benzene ($C_6H_6$) in the coal as shown in formula (ii) above, which is called a sulfonation process to generate benzenesulfonic acid ($C_6H_5SO_3H$), which can be eliminated as sulfonic acid after being separated and reacted with water, as shown in formula (iii). In another embodiment, same as sulfides, the phosphates can also be separated and eliminated in the fractional fluidized distillation zone (130) as shown in formula (vi) above in step 340.

Figure 4:
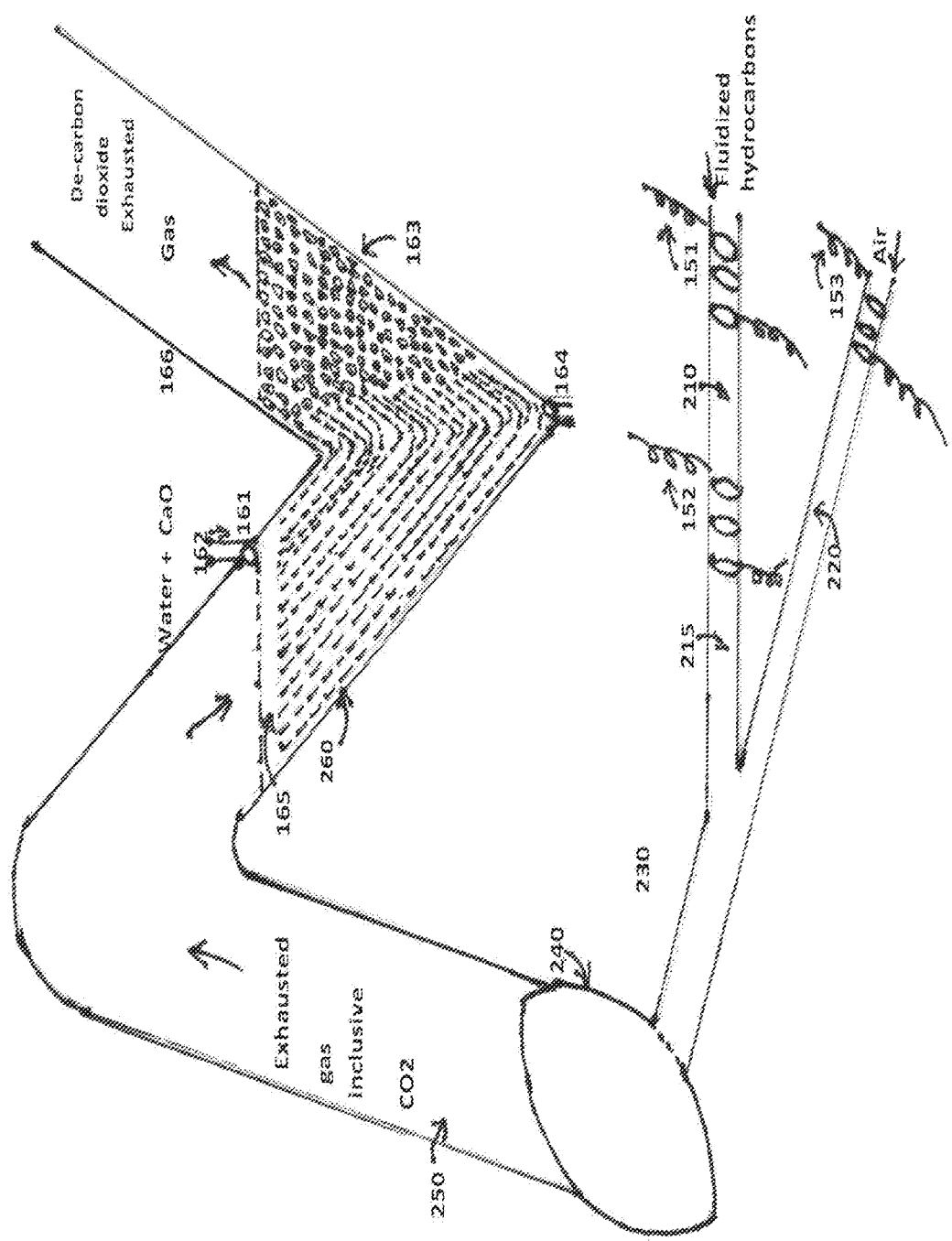
FIG. 4 illustrates a carbon dioxide ($CO_2$) removal process in the present invention.

As shown in FIG. 4, various of hydrocarbons burn in the fire place (240), in the exhaust chamber (250), produce a lot of carbon dioxide ($CO_2$). In the de-carbon dioxide section (260), calcium mono-oxide (CaO) is mixed with water, and the water level was kept by auto controller (161). When inside the section (163), the calcium hydrocarbonate ($Ca(OH)CO_3$) generated in formula (vii) in the section (260) arrives at a saturated level, a sensor may trigger an auto controller (164) to drain out the saturated calcium hydrocarbonate, and the new calcium mono-oxide mixed with the water will then be filled from water intake pipe (162).

When the exhaust gas including carbon dioxide ($CO_2$) passes through a plurality of water pipes (165) of the de-carbon dioxide section (260), the calcium mono-oxide (CaO) mixes with the water will react with carbon dioxide to generate calcium hydrocarbonate ($Ca(OH)CO_3$), as shown in formula (vii). Most of the carbon dioxide ($CO_2$) will then be removed, and the rest of exhausted gas will be gone away from the chimney (166).

$$2\,CO_2+2H_2O+2CaO \rightarrow 2Ca(OH)CO_3+H_2 \qquad \text{(vii)}$$

In summary, coal in the solid form has to be heated without air to 900 to 1200 degree C. to squeeze out the flammable gas of hydrocarbons in a gasified form while eliminating the coal tar. The gasified hydrocarbons are condensed and after eliminating harmful substances in the fluidized phase, the clean hydrocarbons, are saved in a fluidized form, which can be used as clean coal fossil fuel in the future. The clean fluidized hydrocarbon can be reheated to be gasified and electrostatically charged to become positive carriers to mix well with oxygen that is negatively electrostatically charged before burning. The mixture can then be ignited to burn to achieve completely burning. The calcium mono-oxide (CaO) mixes with the water will react with carbon dioxide to generate calcium hydrocarbonate ($Ca(OH)CO_3$), as shown in formula (vii). Then most of the carbon dioxide ($CO_2$) will be removed.

Having described the invention by the description and illustrations above, it should be understood that these are exemplary of the invention and are not to be considered as limiting. Accordingly, the invention is not to be considered as limited by the foregoing description, but includes any equivalent.

What is claimed is:

1. A method for coal purification and complete burning comprising steps of:
   heating the coal in a solid form to a gasified form without air including various hydrocarbons and harmful substances to a predetermined range of temperature in a coal gasifier;
   providing a reaction chamber with oxygen and connecting with the coal gasifier;
   separating the harmful substances from the hydrocarbons;
   condensing the gasified coal from the reaction chamber to collect hydrocarbons in its fluidized phase;
   heating the fluidized hydrocarbons to become a gasified form;
   providing oxygen to mix with the gasified form of the fluidized hydrocarbons; and
   igniting mixed hydrocarbons and oxygen to achieve complete burning.

2. The method for coal purification and complete burning of claim 1, wherein harmful substances include sulfides and phosphates.

3. The method for coal purification and complete burning of claim 2, wherein sulfides can be removed through a sulfonation process according to the formula below:

$$2S+3O_2=2SO_3 \qquad \text{(i)}$$

$$C_6H_6+SO_3=C_6H_5SO_3H \qquad \text{(ii)}$$

$$C_6H_5SO_3H+H_2O=C_6H_6+H_2SO_4 \qquad \text{(iii)}$$

4. The method for coal purification and complete burning of claim 2, wherein phosphates can be removed through a phosphoriation process according to the formula below:

$$2P+3O_2=2PO_3 \qquad \text{(i)}$$

$$C_6H_6+PO_3=C_6H_5PO_3H \qquad (ii)$$

$$C_6H_5PO_3H+H_2O=C_6H_6+H_2PO_4 \qquad (iii)$$

5. The method for coal purification and complete burning of claim 1, wherein carbon dioxide ($CO_2$) generated in the coal purification and complete burning is removed through the formula below:

$$CO_2+2H_2O+2CaO \rightarrow 2Ca(OH)CO_3+H_2$$

6. The method for coal purification and complete burning of claim 1, wherein the fluidized hydrocarbons are positively charged and the oxygen is negatively charged.

7. The method for coal purification and complete burning of claim 1, wherein the predetermined range of temperature in a coal gasifier is 900 to 1200° C.

* * * * *